US012116982B2

(12) United States Patent
Kleif

(10) Patent No.: US 12,116,982 B2
(45) Date of Patent: Oct. 15, 2024

(54) CONTROLLING A WIND FARM WITH WIND TURBINES THAT ARE DAMPING TOWER OSCILLATIONS

(71) Applicant: Siemens Gamesa Renewable Energy A/S, Brande (DK)

(72) Inventor: Bjarke Kleif, Vejle (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 106 days.

(21) Appl. No.: 17/631,913

(22) PCT Filed: Jul. 23, 2020

(86) PCT No.: PCT/EP2020/070770
§ 371 (c)(1),
(2) Date: Feb. 1, 2022

(87) PCT Pub. No.: WO2021/028184
PCT Pub. Date: Feb. 18, 2021

(65) Prior Publication Data
US 2022/0282704 A1    Sep. 8, 2022

(30) Foreign Application Priority Data
Aug. 14, 2019    (EP) .................................... 19191770

(51) Int. Cl.
F03D 7/04    (2006.01)
F03D 7/02    (2006.01)
(52) U.S. Cl.
CPC ........... *F03D 7/048* (2013.01); *F03D 7/0284* (2013.01); *F05B 2270/335* (2013.01)

(58) Field of Classification Search
CPC ...... F03D 7/048; F03D 7/0284; F03D 7/0296; F05B 2270/335; Y02E 10/72
See application file for complete search history.

(56) References Cited

U.S. PATENT DOCUMENTS

| 4,400,659 A | 8/1983 | Barron et al. |
| 2007/0018510 A1 | 1/2007 | Cardinal et al. |
| 2007/0085343 A1 | 4/2007 | Fortmann |
| 2007/0120369 A1 | 5/2007 | Delmerico et al. |
| 2012/0139240 A1 | 6/2012 | Otamendi Claramunt et al. |
| 2013/0131879 A1 | 5/2013 | Andresen et al. |

(Continued)

FOREIGN PATENT DOCUMENTS

| CN | 107076116 A | 8/2017 |
| CN | 108457797 A | 8/2018 |

(Continued)

OTHER PUBLICATIONS

International Search Report & Written Opinion for PCT/EP2020/070770 issued on Oct. 23, 2020.

*Primary Examiner* — Joseph Ortega
(74) *Attorney, Agent, or Firm* — Schmeiser, Olsen & Watts LLP

(57) ABSTRACT

Provided is a method of controlling at least one wind turbine having a wind turbine tower and being connected to a utility grid, the method including: dynamically filtering a utility grid active power in dependence of a damping signal provided for counteracting an oscillation of the wind turbine tower; and controlling the wind turbine in dependence of the filtered utility grid active power.

18 Claims, 4 Drawing Sheets

(56) References Cited

U.S. PATENT DOCUMENTS

| | | | |
|---|---|---|---|
| 2014/0232198 A1* | 8/2014 | Garcia | H02J 3/381 290/44 |
| 2015/0035281 A1 | 2/2015 | Lopez Rubio et al. | |
| 2019/0238077 A1 | 8/2019 | Azar et al. | |

FOREIGN PATENT DOCUMENTS

| | | |
|---|---|---|
| EP | 1746285 A2 | 1/2007 |
| EP | 1790850 A1 | 5/2007 |
| EP | 2 384 540 A2 | 11/2011 |
| EP | 2 487 784 A1 | 8/2012 |
| EP | 2865889 A1 | 4/2015 |
| GB | 2330256 A | 4/1999 |
| WO | 2010/086032 A3 | 8/2010 |

* cited by examiner

CONTROLLING A WIND FARM WITH WIND TURBINES THAT ARE DAMPING TOWER OSCILLATIONS

CROSS-REFERENCE TO RELATED APPLICATIONS

This application claims priority to PCT Application No. PCT/EP2020/070770, having a filing date of Jul. 23, 2020, which claims priority to EP Application No. 19191770.7, having a filing date of Aug. 14, 2019, the entire contents both of which are hereby incorporated by reference.

FIELD OF TECHNOLOGY

The following relates to a method and to an arrangement of controlling at least one wind turbine having a wind turbine tower and being connected to a utility grid. The following further relates to a wind turbine having the arrangement.

BACKGROUND

A wind turbine may comprise a wind turbine tower and a nacelle mounted on top of the wind turbine tower which harbours a main rotor at which plural rotor blades are connected. The main rotor is mechanically coupled to a generator to produce electric energy upon rotation of the rotation shaft.

During operation of the wind turbine, tower oscillations may occur including back and forth oscillation of the wind turbine tower. Conventionally, methods have been proposed to dampen tower oscillations by modulating the active power production with the tower eigenfrequency of the tower oscillations. However, it has been observed that, when the wind turbine is controlled and curtailed by the park level active power controller, the wind turbine will introduce an error in the active power production caused by the tower damping. Thereby, instability of the control may result, or the utility grid stability may be hampered. Because the tower eigenfrequency (for example 0.21 Hz to 0.25 Hz) lies within the bandwidth range of the park level active power feedback controller, the park level controller will try to counter the tower damping causing more fatigue load on the wind turbine and potentially pushing the tower damping controller into its operational bounds.

Thus, there may be a need for a method and an arrangement of controlling at least one wind turbine such that an error in the active power production may be reduced, while tower oscillations are effectively damped (thus, damping of tower oscillation is active). Furthermore, there may be a need for a control method, wherein grid stability can be improved and at the same time wind turbine tower oscillations are damped.

SUMMARY

An aspect relates to a method of controlling at least one wind turbine having a wind turbine tower and being connected to a utility grid, the method comprising: dynamically filtering a utility grid active power in dependence of a damping signal provided for counteracting an oscillation of the wind turbine tower; and controlling the wind turbine in dependence of the filtered utility grid active power.

The method may be performed partly or entirely by a wind turbine controller and/or partly or entirely by a wind park controller. Embodiments of the present invention operate on the wind turbine level and other embodiments of the present invention operate on a wind park level. The utility grid active power may for example be obtained by measuring the active power provided by the wind turbine or the entire wind park to the utility grid. Thereby, measurement equipment for example installed at or close to a point of common coupling or installed between the wind park and the utility grid may be utilized.

The controlling the wind turbine may comprise supplying a respective control signal to a converter of the wind turbine. The converter may comprise plural controllable switches, such as IGBTs, wherein pairs for each phase may be provided in series. The converter may comprise an AC-DC section, a DC link and a DC-AC section. The converter may be connected between the generator of the wind turbine and the output terminal of the wind turbine or a wind turbine transformer.

The damping signal is designed to counteract an oscillation of the wind turbine tower, in particular a back-and-forth oscillation of the wind turbine tower. The damping signal may define a supplemental active power signal which is added on a wind turbine level to for example a preliminary power reference. One or more eigenoscillations of the wind turbine tower may be counteracted by the damping signal. Thus, the damping signal may contain for a single wind turbine one or more frequency components or frequency ranges and having corresponding or associated amplitude information. If the method is performed on a park level, the damping signal may comprise a combination of individual wind turbine damping signals. The damping signal may comprise frequency components in one or more frequency ranges.

The filtered utility grid active power may have the amplitude of frequency components decreased which are comprised in the damping signal. When the utility grid active power is filtered in dependence of the damping signal, the damping signal is in the further control method not considered as an error which a controller needs to counteract. Thereby, the output of the wind turbine may to a better degree comply with an externally provided active power reference. For controlling the wind turbine, one or more controllers may be provided on park level and/or wind turbine level.

According to an embodiment of the present invention, controlling the wind turbine comprises: supplying a first active power difference between an externally defined active power reference and the filtered utility grid active power to an active power controller; outputting by the active power controller, a preliminary power reference to at least one wind turbine.

The externally defined active power reference may refer, when the method is performed on the wind turbine level, to a desired active power output of the individual or single wind turbine. When the method is performed on park level, the externally defined active power reference may refer to a desired wind park active power output of the entire wind park.

The preliminary power reference is derived by the active power controller based on the supplied first active power difference. The preliminary power reference is not finally used to control the wind turbine but to the preliminary power reference at least the damping signal of the respective wind turbine is added. Thereby, the effective damping of tower oscillations of the respective wind turbine is achieved while at the same time complying in an improved manner with the externally defined active power reference.

In this embodiment, the active power controller is provided already with an input difference signal from which the frequency components of the damping signal are reduced or even removed.

According to another embodiment of the present invention, controlling the wind turbine comprises supplying a second active power difference between an externally defined active power reference and the utility grid active power to an active power controller; outputting by the active power controller, a control signal from which the filtered utility grid active power is subtracted in order to derive a preliminary power reference that is supplied to at least one wind turbine.

The second active power difference is, as may be conventionally known, derived as a difference between the externally defined active power reference and the utility grid active power (i.e., the unfiltered signal). According to this embodiment, considering the damping signal is performed at the output level of the active power controller. Thereby, also, counteracting the desired damping action is avoided.

According to an embodiment of the present invention, the active power controller is configured to derive the preliminary control signal such as to decrease the active power difference. The active power controller may for example comprise a PID or PI controller. The active power controller may have been tuned in order to derive the respective output such that the input difference decreases more and more. Thereby, conventionally known controllers may be utilized.

According to an embodiment of the present invention, dynamically filtering the utility grid active power in dependence of the damping signal comprises using a band-stop filter which reduces, in the utility grid active power, amplitudes of frequency components of the damping signal, to between 0% and 10%, wherein the damping signal comprises in particular frequency components in a range between 0.1 Hz and 1 Hz, in particular between 0.2 Hz and 0.3 Hz.

The band-stop filter may be configured for filtering out or at least reducing frequency components of the respective input signal in one or more frequency ranges. The one or more frequency ranges may be determined based on the damping signal to cover those frequencies which are comprised in the damping signal. The range may define a respective bandwidth of the filter. The filter may comprise several filter components each for each frequency range. The respective frequency ranges are filtered out in the utility grid active power. Frequency components in the range between 0.1 and 1 Hz are typical for tower oscillations. Therefore, the damping signal counteracting the respective tower oscillations is effectively filtered out in the filtered utility grid active power. Thereby, the method may still be improved regarding better compliance of the actual active power output of the wind turbine with the externally defined active power reference.

According to an embodiment of the present invention, the method further comprises generating, by a damping controller, the damping signal based on a tower oscillation indicating signal, to counteract at least a back and forth oscillation of the wind turbine tower, wherein the tower oscillation indicating signal is in particular measured by an accelerometer.

The tower oscillation indicating signal may indicate frequency and amplitude of one or more tower oscillations. The damping signal may be derived to be phase offset to the tower oscillation indicating signal, in order to counteract the tower oscillation. For example, when the tower moves back and forth, in a time span during which the tower moves backwards, the load of the generator may be decreased (in particular involving reducing active power output). When the wind turbine tower moves forward or is in a frontal position of the back and forth oscillation, it may be desired to increase the load (involving increasing active power output of the wind turbine). In this counteracting way, the damping signal may involve modulating the active power output of the wind turbine. The accelerometer may be arranged at a nacelle or at the wind turbine tower. Thereby, implementing the method is simplified including utilization of conventionally available equipment. Also, the damping controller may comprise a PID or PI controller.

According to an embodiment of the present invention, the method further comprises adding, at each wind turbine, the respective damping signal to the preliminary power reference to obtain a wind turbine active power reference signal; and controlling the wind turbine using the wind turbine active power reference signal.

The preliminary power reference may not be designed to dampen tower oscillations. In contrast, the respective damping signal is designed to counteract the tower oscillation. Thus, adding the respective damping signal to the preliminary power reference results in the wind turbine active power reference signal to effectively causing damping of tower oscillation as well as complying with the desired or externally defined active power reference.

According to embodiments of the present invention, further supplemental control signals may be added for other control purposes, such as torque ripple reduction and so on.

According to an embodiment of the present invention, the method further comprises filtering the filtered utility grid active power using a transition filter triggered by a detected transient in the utility grid active power, the output of the transition filter being derived as a weighted sum of the filtered utility grid active power and the (unfiltered) utility grid active power.

The transition filter may be provided for reducing a ripple which may occur after a large transient in the measured grid active power. Thus, the filtered utility grid active power and the (unfiltered) utility grid active power is added in a weighted manner to obtain a composite signal which may be effective in reducing a ripple due to a large change in the measured grid active power. The transient may be defined according to the particular application. Detection of a transient may for example be defined when the utility grid active power changes in a particular time span more than a threshold. The threshold and the length of the time span may be adapted according to the particular application. Thereby, the method may still be improved.

According to an embodiment of the present invention, weighting coefficients sum to one and change with a time elapsed since the occurrence of the transient. Thus, for each transient, the transition filter is triggered again, and the weighted sum is calculated starting at the occurrence of the transient. The longer after the occurrence of the transient, the higher is the weighting of the filtered utility grid active power. Thereby, a smooth and reliable and safe control of the wind turbine may be achieved.

According to an embodiment of the present invention, the weighting coefficient of the utility grid active power is highest at (or immediately or shortly after) the occurrence of the transient and then decreases with time to zero, in particular according to an exponential function. Thereby, an effective implementation is enabled. Further, a smooth transition to the situation when there is no transient is achieved, since the output of the transition filter more and more approaches the filtered utility grid active power which is utilized when there is no transient detected in the utility grid active power.

According to an embodiment of the present invention, the transient is detected, if the utility grid active power changes by more than an active power threshold, in particular between 5% and 20% of a rated power, during a time span, in particular between 0.1 s and 10 s. According to other embodiments, the threshold may be set to different values.

According to another embodiment of the present invention, the method is performed on a park level, wherein the method is adapted to control plural wind turbines of a wind park, wherein the externally defined active power reference is an externally defined wind park active power reference; wherein the damping signal is a (sum) signal combined from individual damping signals of all the wind turbines, each provided for counteracting an oscillation of an respective wind turbine tower, wherein the preliminary active power reference is defining a preliminary wind park active power reference.

Herein, the damping signal may be the sum of the individual damping signals of all the wind turbines. This sum of the individual damping signals may comprise plural frequency components which may lie within one or more frequency ranges. The respective filtering may involve reducing the amplitude of the frequencies in these one or more frequency ranges.

According to another embodiment, however, the method may be performed individually for each wind turbine of the wind park. In this case, the externally defined active power reference may have the meaning of an externally defined wind turbine active power reference. The damping signal may be the damping signal of the considered wind turbine. The preliminary control signal may define a preliminary wind turbine active power reference. The utility grid active power may relate to the actual active power output of the considered wind turbine.

According to this embodiment, the method may further comprise dividing the preliminary wind park active power reference into plural preliminary power references for all wind turbines.

Thereby, each wind turbine may receive a respective preliminary power reference which does not interfere with a damping controller which may be comprised in and is operating within the wind turbine for damping tower oscillations.

It should be understood that features, individually or in any combination, disclosed, described, explained or applied for a method of controlling at least one wind turbine having a wind turbine tower is also, individually or in any combination, applicable to an arrangement for controlling at least one wind turbine having a wind turbine tower according to an embodiment of the present invention and vice versa.

According to an embodiment of the present invention it is provided an arrangement for controlling at least one wind turbine having a wind turbine tower and being connected to a utility grid, the method comprising: a band-stop filter adapted to dynamically filter a utility grid active power in dependence of a damping signal provided for counteracting an oscillation of the wind turbine tower; and a controller adapted to control the wind turbine in dependence of the filtered utility grid active power.

The arrangement may be comprised partly or entirely in a wind park controller or/and a wind turbine controller. The arrangement may comprise hardware components and software components.

According to an embodiment of the present invention it is further provided a wind turbine comprising a wind turbine tower and an arrangement according to the preceding embodiment.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 1 schematically illustrates a wind park comprising an arrangement for controlling at least one wind turbine having a wind turbine tower according to an embodiment of the present invention;

FIG. 2 schematically illustrates a wind turbine according to an embodiment of the present invention;

DETAILED DESCRIPTION

Figure 1:
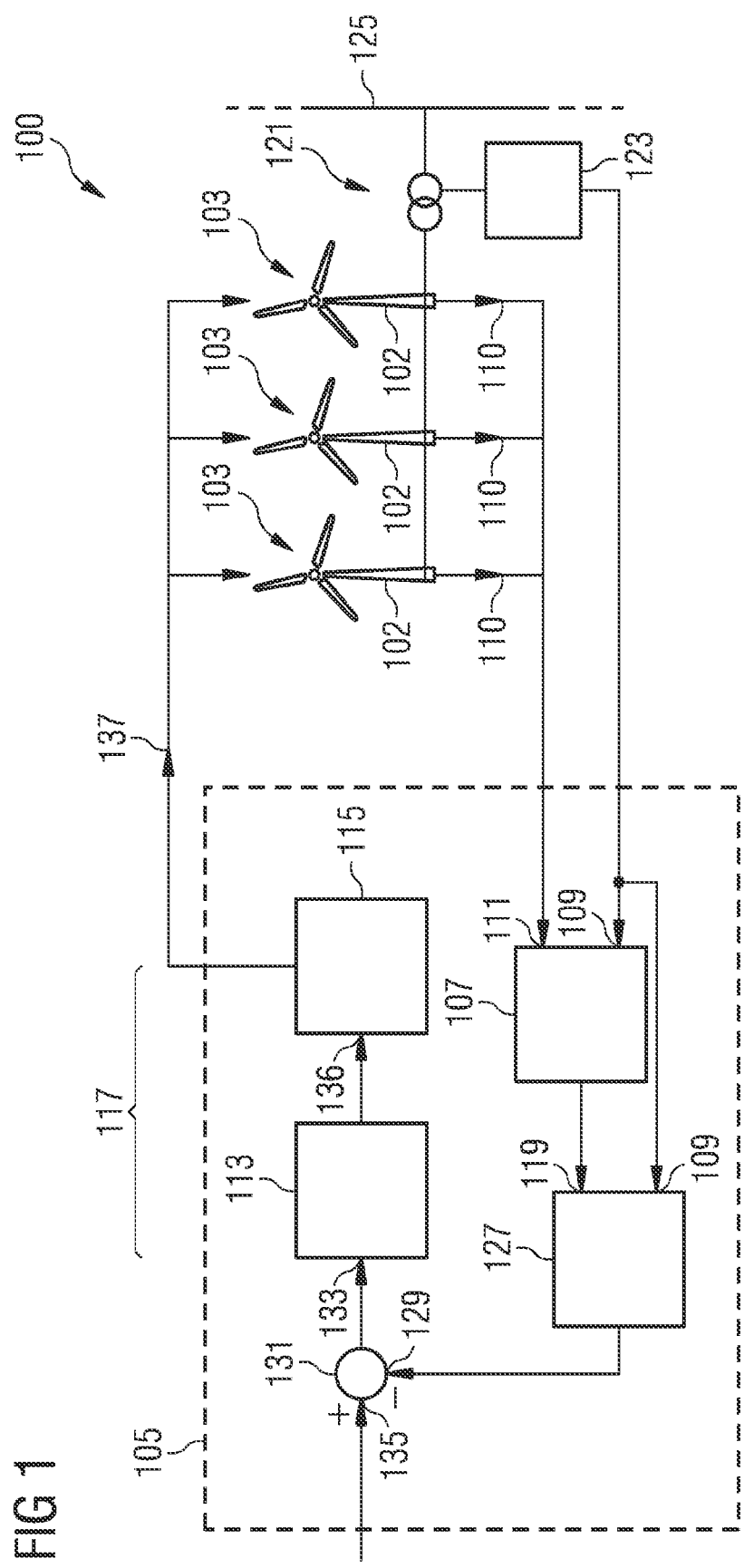

The illustration in the drawings is in schematic form. It is noted that in FIGS. 1 and 2, elements similar or identical in structure and/or function are provided with the same reference signs or with reference signs, which differ only within the first digit. A description of an element not described in one embodiment may be taken from a description of this element with respect to another embodiment.

The wind park 100 schematically illustrated in FIG. 1 comprises plural wind turbines 103 and a park level controller 105 as an implementation of an arrangement for controlling at least one wind turbine having a wind turbine tower according to an embodiment of the present invention. The arrangement 105 comprises a band-stop filter 107 which is adapted to dynamically filter a utility grid active power 109 in dependence of a damping signal 111 provided for counteracting an oscillation of a respective wind turbine tower of all the wind turbines 103. The damping signal 111 is the sum of individual wind turbine damping signals 110 of the individual wind turbines.

The arrangement 105 further comprises control equipment in particular including an active power controller 113 and an active power dispatcher 115 representing an implementation of a controller 117 which is adapted to control the wind turbines 103 in dependence of the filtered utility grid active power 119 which is output by the band-stop filter 107 in dependence of the measured grid active power 109 and the damping signal 111. The wind park 100 further comprises a wind turbine transformer 121 and comprises grid measurement equipment 123 for measuring the utility grid active power 109. During normal operation, the wind turbines 103 provide electrical energy via the wind farm transformer 121 to a utility grid 125.

In the embodiment as illustrated in FIG. 1, the arrangement 105 further comprises a transition filter 127 which may be triggered by a detected transient of the utility grid active power. Thus, the transition filter also receives the utility grid active power 109 and detects whether a transient has occurred. The transient may involve a large change in the utility grid active power 109 in a particular time window. The transition filter 109 further receives as input the filtered utility grid active power 119 as output by the band-stop filter 107. The transition filter 127 derives a weighted sum of the filtered utility grid active power 119 and the (unfiltered) utility grid active power 109 and outputs the weighted sum 129 (e.g., as controller grid active power) supplying it to a difference element 131. Thereby, the difference element 131 computes a first active power difference 133 between an externally defined active power reference 135 and the weighted sum 129 output by the transition filter 127.

The first active power difference 133 is supplied to the active power controller 113 which outputs based thereon, a preliminary power reference 136, here a preliminary wind park power reference. This preliminary wind park power reference 136 is supplied to an active power dispatcher 115 which divides the wind park active power reference 136 into plural preliminary power references 137 for all wind turbines.

As is depicted in FIG. 1, the park level controller 105 requests the tower damping frequency and amplitudes from the turbine (for example as damping signal 111). The resulting frequency and bandwidth is calculated in the park level controller 105 online and used in a dynamic band-stop filter 107 to remove the resulting tower damping frequency from the measured active power feedback to the park level active power feedback controller 113.

If there is a large transient in the measured grid active power, the band-stop filter 107 could introduce a ripple into the filtered grid active power 119. Therefore, a transition filter 127 is introduced to combine the filtered grid active power and the measured grid active power (signals 109 and 119) with different weights wA and wB such that the weighted sum 129 (also referred to as controller grid active power) is given by controller grid active power=wA*Filtered grid active power(signal 119)+wB*grid active power(signal 109)

with wA+wB=1

When a large change in the measured grid active power 9 is detected, wB=1 and wA=0 and wB will go towards 0 through a mathematical function such as: wB=exp(-λ*t)

Thus, the weighted sum 29 (controller grid active power as given by controller grid active power=(1-exp(-λ*t))*Filtered grid active power+exp(-λ*t)*grid active power Herein, t will be increasing over time (since the occurrence of the transient) and X is selected such that minimal ripple at transient responses is generated and the setting time of the filter is within a reasonable time.

Figure 2:
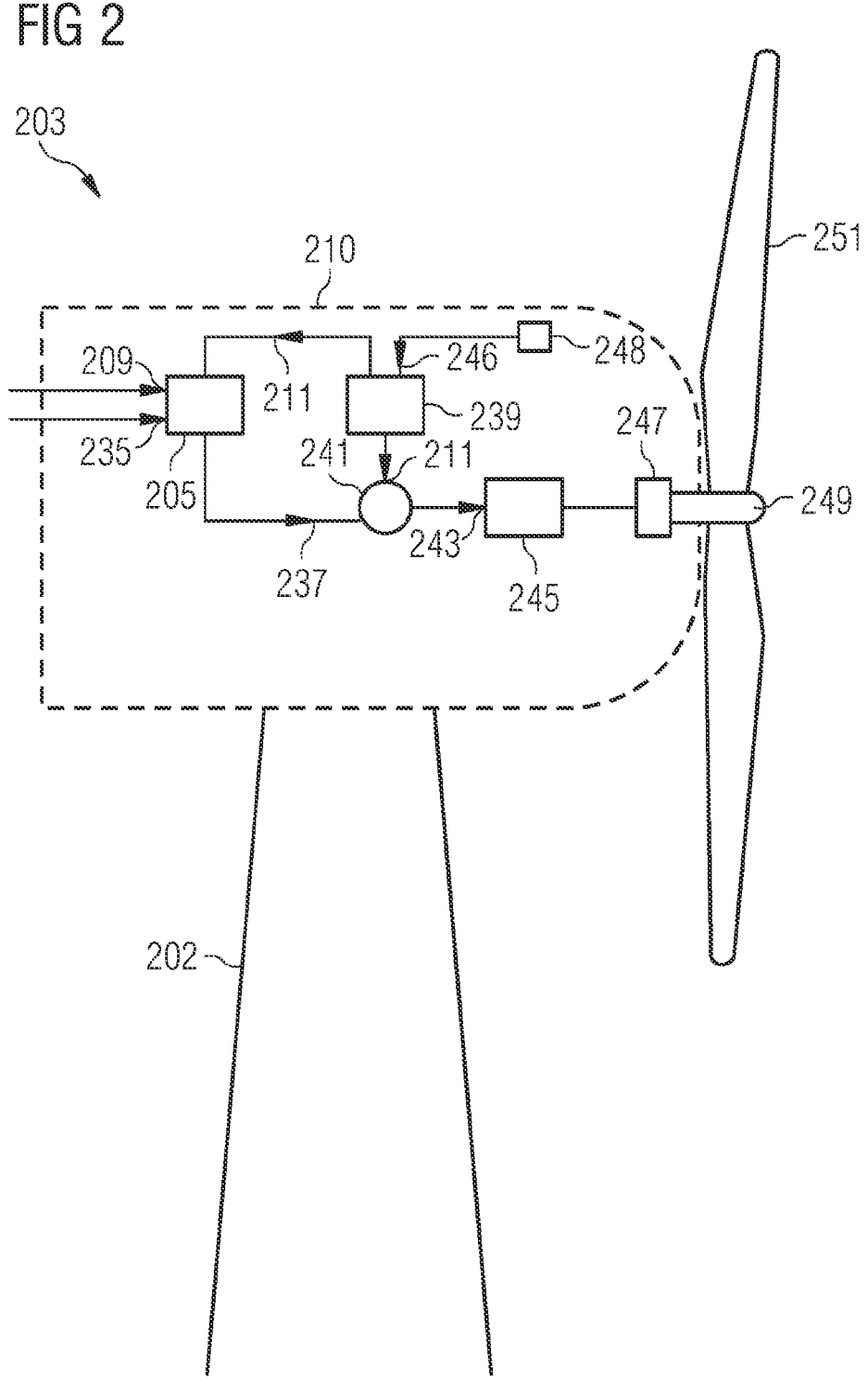

FIG. 2 schematically illustrates a wind turbine 203 according to another embodiment, wherein the arrangement 205 is comprised in the wind turbine 203. The arrangement 205 receives a measured utility grid active power 209. Further, the controller 205 receives a damping signal 211 from a damping controller 239 also comprised in the wind turbine 203. The arrangement 205 has similarly as the arrangement 105 illustrated in FIG. 1. A band-stop filter derives from the utility grid active power 209 and the damping signal 211 a filtered active utility grid active power. The filtered utility grid active power is then subtracted from the utility grid active power and supplied to an active power controller (similar to active power controller 113 illustrated in FIG. 1) which derives therefrom a preliminary active power reference 237.

The damping signal 211 is added to the preliminary power reference 237. The output of the addition element 241 is the wind turbine active power reference signal 243. This signal is supplied to a converter 245 which is connected to the generator 247 which is connected to the main rotation shaft 249 at which plural rotor blades 251 are connected. Thus, the active power reference signal 243 is adapted to effectively dampen tower oscillations of the tower 202 of the wind turbine 203 as well as to comply with the externally defined active power reference 209 defining the desired active power of the wind turbine active power output.

The arrangement 205 receives an externally defined wind turbine active power reference (an implementation of an externally defined active power reference) 235. The damping controller 239 receives an oscillation indicating signal 246 from an accelerometer installed in nacelle 210.

Figure 3:
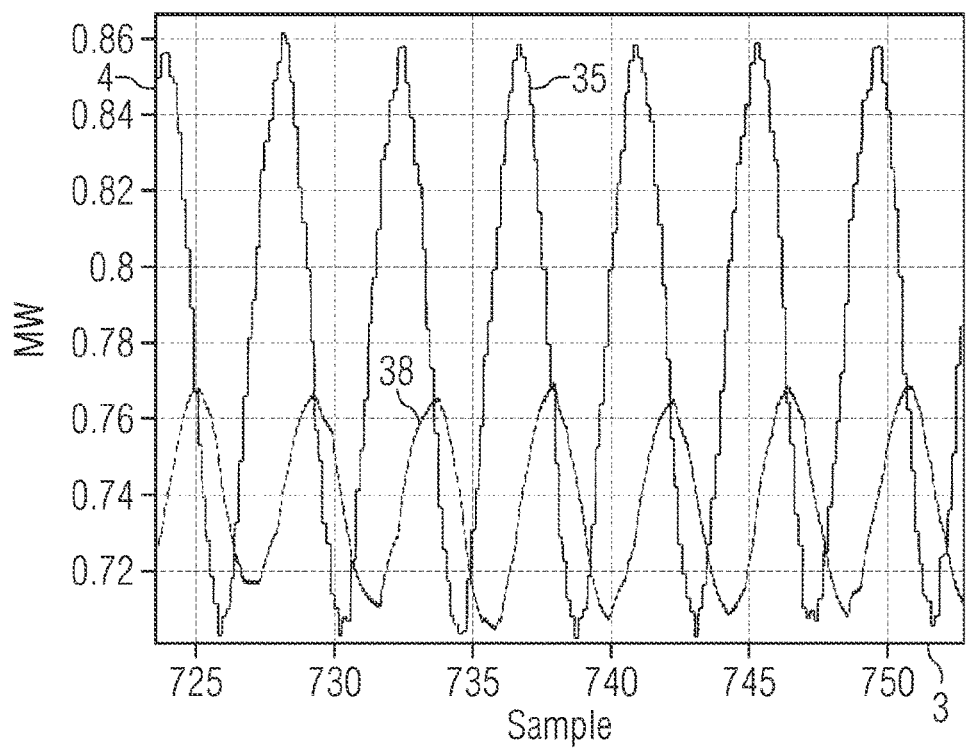
FIG. 3 illustrates a graph showing performance of a control method according to embodiments of the present invention and the conventional art.
Figure 4:
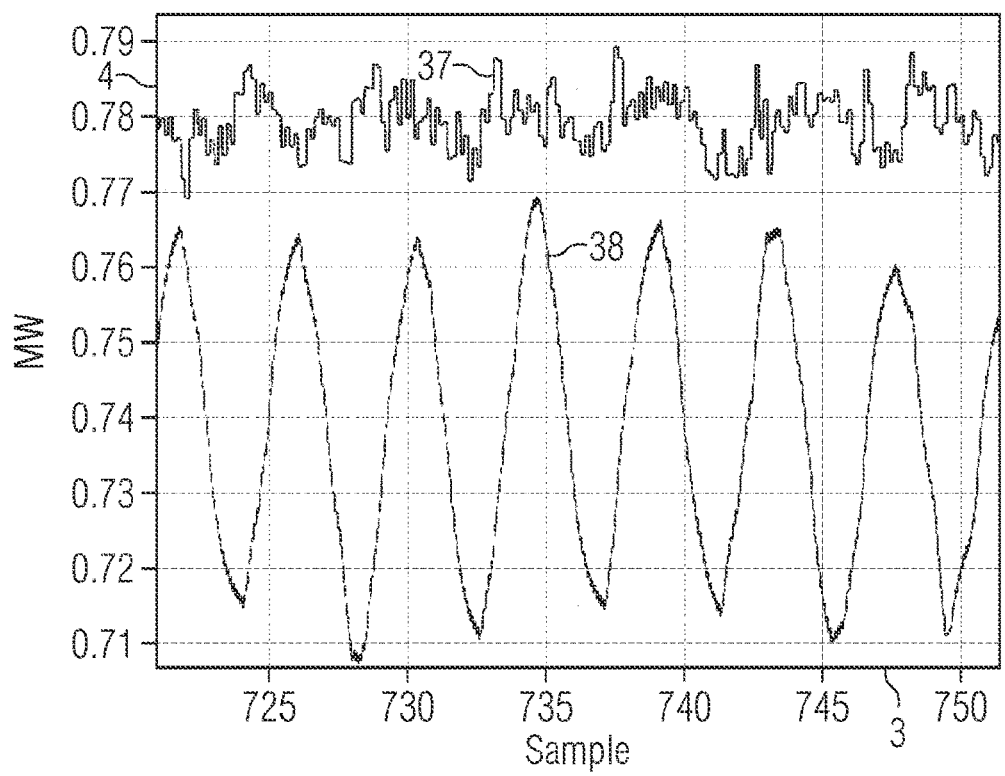
FIG. 4 illustrates a graph showing performance of the wind turbine active power reference, in particular the preliminary active power reference.

FIGS. 3 and 4 indicate measurement results according to the conventional art and according to embodiments of the present invention or according to an embodiment of the present invention, respectively, wherein abscissas 3 indicate the sample number or the time while the ordinates 4 indicate power output in Megawatt.

FIG. 3 shows for the conventional control method the wind turbine active power reference 35 as derived by a conventional wind park controller and the turbine active power output 38 as output by the respective wind turbine. As can be seen from FIG. 3, the wind turbine active power reference 35 comprises an oscillating behaviour having the same frequency as the active power output 38 but being phase-shifted. Thus, both signals counteract each other.

In the FIG. 4 according to an embodiment of the present invention, also the wind turbine active power reference, in particular the preliminary active power reference 37 is illustrated as well as the actual power output 38 of the wind turbines. It can be seen that the preliminary active power reference 37 does not comprise an oscillating behaviour as the conventional curve as illustrated in FIG. 3. However, the actual active power output 38 of the wind turbine comprises an oscillating behaviour causing an effective damping of tower oscillations.

Figure 5:
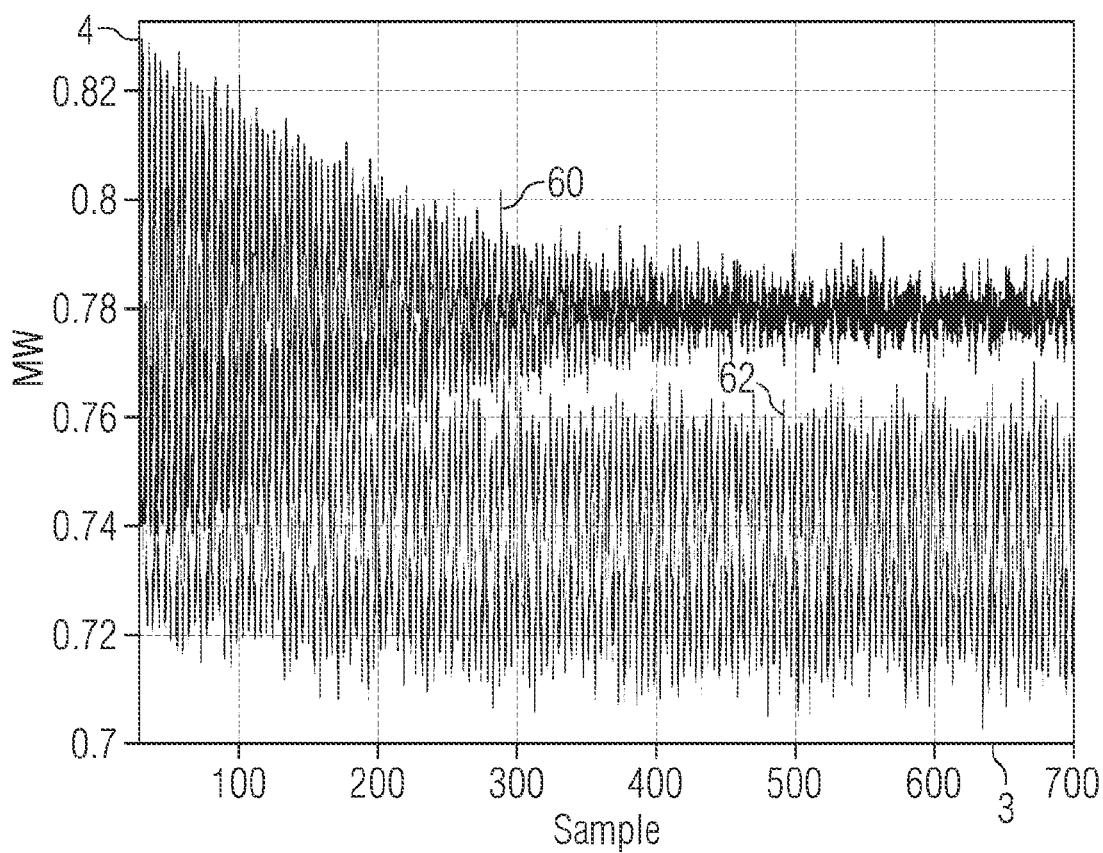
FIG. 5 illustrates a graph having the abscissa indicating the sample number or the time and having an ordinate indicating the power.

FIG. 5 illustrates a graph having the abscissa 3 indicating the sample number or the time and having an ordinate 4 indicating the power. The curve 60 indicates the wind turbine active power reference while the curve 62 indicates the turbine active power. These data have been obtained after a reset of the transition filter 27. It can be seen that the turbine active power reference 60 quickly decays to small values. Thereby, ripples are effectively avoided or at least reduced.

Embodiments of the present invention may include the following features or achieve the following advantages:

The park level controller using the tower damping frequency and amplitudes from the turbine avoids counteracting the tower damping which will allow the tower damping controller to operate within its full dynamic range to counter tower oscillations which will cause less fatigue on the turbine and extend the lifetime of the turbine.

The park level active power controller will not experience additional error caused by the tower damping on the turbine, which is uncontrollable from the park level, making it possible to design a park level active power controller with a narrower operational range which will allow for less active power overshoot which will improve compliance to grid codes and protection of transmission equipment such as high voltage transformers.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling at least one wind turbine having a wind turbine tower and being connected to a utility grid, the method comprising:
    providing a damping signal for counteracting an oscillation of the wind turbine tower;
    providing a utility grid active power;
    dynamically filtering the utility grid active power in dependence of the damping signal provided for counteracting the oscillation of the wind turbine tower to form a filtered utility grid active power; and
    controlling the wind turbine in dependence of the filtered utility grid active power.

2. The method according to claim 1, wherein controlling the wind turbine comprises:
    supplying a first active power difference between an externally defined active power reference and the filtered utility grid active power derived signal to an active power controller; and
    outputting by the active power controller, a preliminary power reference to at least one wind turbine.

3. The method according to claim 2, wherein the active power controller is configured to derive the preliminary control signal such as to decrease the first active power difference.

4. The method according to claim 1, wherein controlling the wind turbine comprises:
    supplying a second active power difference between an externally defined active power reference and the utility grid active power to an active power controller; and
    outputting by the active power controller, a control signal from which the filtered utility grid active power is subtracted in order to derive a preliminary power reference that is supplied to at least one wind turbine.

5. The method according to claim 1, wherein dynamically filtering the utility grid active power in dependence of the damping signal comprises using a band-stop filter which reduces, in the utility grid active power, amplitudes of frequency components of the damping signal, to between 0% and 10%,
    wherein damping signal comprises in particular frequency components in a range between 0.1 Hz and 1 Hz, or between 0.2 Hz and 0.3 Hz.

6. The method according to claim 1, further comprising:
    generating, by a damping controller, the damping signal based on a tower oscillation indicating signal, to counteract at least a back and forth oscillation of the wind turbine tower; and
    wherein the tower oscillation indicating signal is in particular measured by an accelerometer.

7. The method according to claim 1, further comprising:
    adding, at each wind turbine, the respective damping signal to the preliminary power reference to obtain a wind turbine active power reference signal; and
    controlling the wind turbine using the wind turbine active power reference signal.

8. The method according to claim 1, further comprising:
    filtering the filtered utility grid active power using a transition filter triggered by a detected transient in the utility grid active power, the output of the transition filter being derived as a weighted sum of the filtered utility grid active power and the utility grid active power.

9. The method according to claim 8, wherein weighting coefficients sum to one and change with a time elapsed since the occurrence of the transient.

10. The method according to claim 9, wherein the weighting coefficient of the utility grid active power is highest at the occurrence of the transient and then decreases with time to zero, in particular according to an exponential function.

11. The method according to claim 8, wherein the transient is detected, if the utility grid active power changes by more than an active power threshold, in particular between 5% and 20% of a rated power, during a time span.

12. The method according to claim 1,
    wherein the method is configured to control plural wind turbines of a wind park,
    wherein the externally defined active power reference is an externally defined wind park active power reference;
    wherein the damping signal is a signal combined from individual damping signals of all the wind turbines, each provided for counteracting an oscillation of a respective wind turbine tower; and
    wherein the preliminary active power reference is defining a preliminary wind park active power reference.

13. The method according to claim 1, further comprising:
    dividing the preliminary wind park active power reference into plural preliminary power references for all wind turbines.

14. The method according to claim 1, wherein the oscillation of the wind turbine tower is an eigenoscillation of the wind turbine tower.

15. An arrangement for controlling at least one wind turbine having a wind turbine tower and being connected to a utility grid, the arrangement comprising:
    a band-stop filter configured to dynamically filter a utility grid active power in dependence of a damping signal provided for counteracting an oscillation of the wind turbine tower to form a filtered utility grid active power; and
    a controller configured to control the wind turbine in dependence of the filtered utility grid active power.

16. A wind turbine comprising:
    a wind turbine tower; and
    an arrangement according to claim 15.

17. The arrangement according to claim 15, wherein the oscillation of the wind turbine tower is an eigenoscillation of the wind turbine tower.

18. A method of controlling at least one wind turbine having a wind turbine tower and being connected to a utility grid, the method comprising:
    dynamically filtering a utility grid active power in dependence of a damping signal provided for counteracting an oscillation of the wind turbine tower; and
    controlling the wind turbine in dependence of the filtered utility grid active power, wherein dynamically filtering the utility grid active power in dependence of the damping signal comprises using a band-stop filter which reduces, in the utility grid active power, amplitudes of frequency components of the damping signal, to between 0% and 10%, wherein the damping signal comprises frequency components in a range between 0.1 Hz and 1 Hz, or between 0.2 Hz and 0.3 Hz.

\* \* \* \* \*